July 27, 1937.　　　　　A. B. SCOTT　　　　　2,088,096
SOUND SHIFT APPARATUS FOR FRONT OR REAR PROJECTION
Filed Sept. 16, 1935　　　2 Sheets-Sheet 1
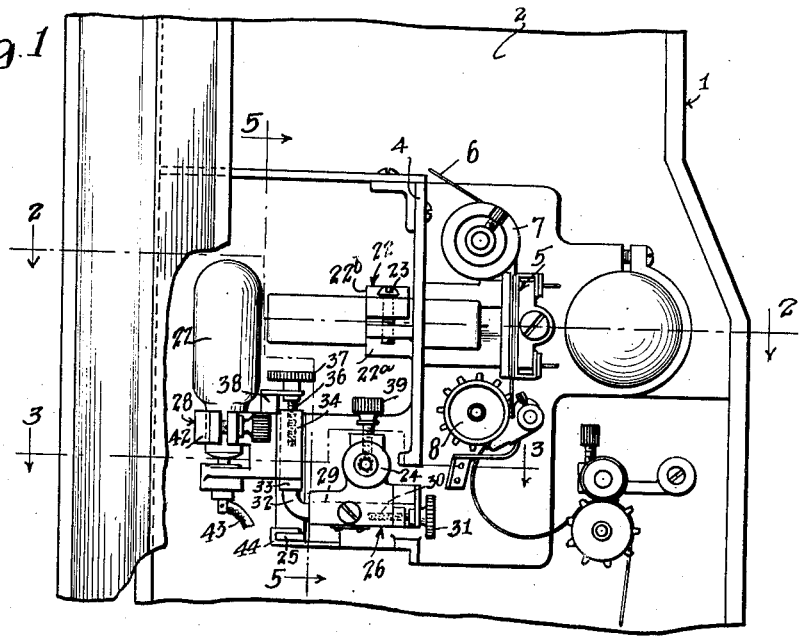
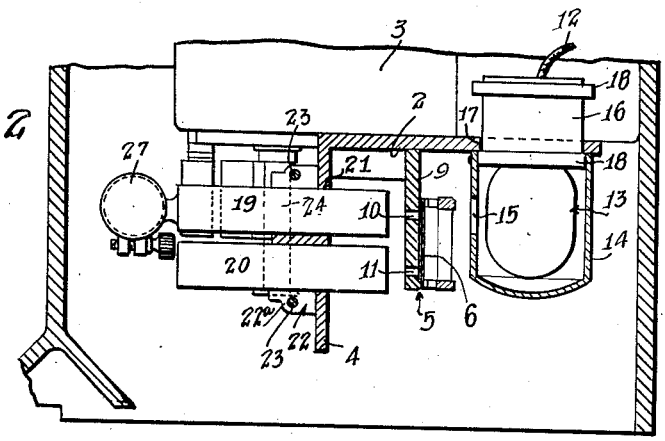
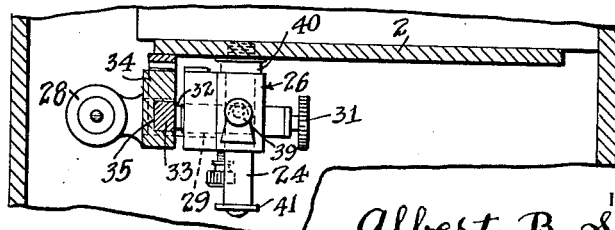
INVENTOR.
Albert B. Scott
BY
Lyon & Lyon
ATTORNEYS July 27, 1937.  A. B. SCOTT  2,088,096
SOUND SHIFT APPARATUS FOR FRONT OR REAR PROJECTION
Filed Sept. 16, 1935  2 Sheets-Sheet 2

INVENTOR
Albert B. Scott
BY Lyon & Lyon
ATTORNEYS

Patented July 27, 1937

2,088,096

UNITED STATES PATENT OFFICE 2,088,096

SOUND-SHIFT APPARATUS FOR FRONT OR REAR PROJECTION

Albert B. Scott, Los Angeles, Calif.

Application September 16, 1935, Serial No. 40,768

6 Claims. (Cl. 88—16.2)

This invention relates to apparatus for projecting motion pictures onto a screen. Although it is usual to project motion pictures onto the forward side of the screen, it is sometimes desirable to project the pictures onto the rear side of the screen. This, of course, is only possible where the screen is especially constructed to permit this.

The present invention concerns an apparatus for projecting motion pictures from a film having a sound record adjacent one edge, and a principal object of the invention is to provide apparatus of simple construction, which can be used with equal facility for projecting motion pictures upon either the forward or rear side of the screen, and to provide the apparatus with means for enabling the sound record to be reproduced with equal facility regardless of whether the picture is projected onto the forward or rear side of the screen.

It is evident that when projection apparatus is moved from the forward side of the screen to a position at the rear of the screen, it is necessary to reverse the film in the film guide, otherwise the titles and sub-titles thrown onto the screen would be reversed. The reversal of the film in the film guide, which is necessary to have the titles and sub-titles read correctly, brings the sound record on the film to the opposite side of the film guide, and with an ordinary projection apparatus this would render it impossible to employ a sound record on the film for reproducing the sounds that accompany the action depicted in the motion pictures.

One of the objects of this invention is to provide simple means for enabling the sound reproduction apparatus to adapt itself to the reversed position of the film; also to provide for adapting the light aperture to the reversed position of the film.

Further objects of the invention will appear hereinafter.

The invention consists in the novel parts and combination of parts to be described hereinafter, all of which contribute to produce an efficient sound-shift apparatus for front or rear projection.

A preferred embodiment of the invention is described in the following specification, while the broad scope of the invention is pointed out in the appended claims.

In the drawings:

Figure 1 is a side elevation of a portion of the apparatus of a projection machine as though viewed with the side cover of the case removed. In this view certain parts are broken away. This view illustrates the parts of my invention.

Fig. 2 is a horizontal section taken about on the line 2—2 of Fig. 1, and further illustrating my improvement. This view shows the apparatus adapted for reproducing sound or speech of the actors, from a sound record formed on the edge of the film remote from the door, and this view should be compared with Fig. 5 to be described hereinafter, which illustrates the apparatus set for reproducing sounds from the film when in its reversed position.

Fig. 3 is a horizontal section taken about on the line 3—3 of Fig. 1, and further illustrating details of the apparatus.

Figure 4:
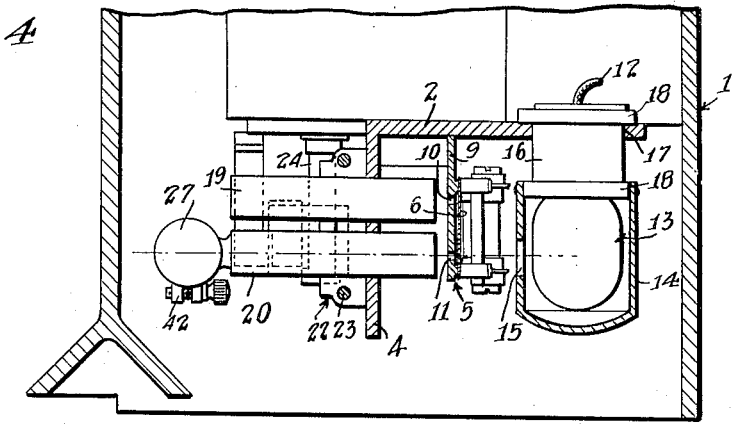
Fig. 4 is a view similar to Fig. 2, but showing the apparatus in the relation set for reproducing sounds from a film mounted in the reversed position in the film guide, and with the sound record located on the edge of the film toward the door of the case.
Figure 5:
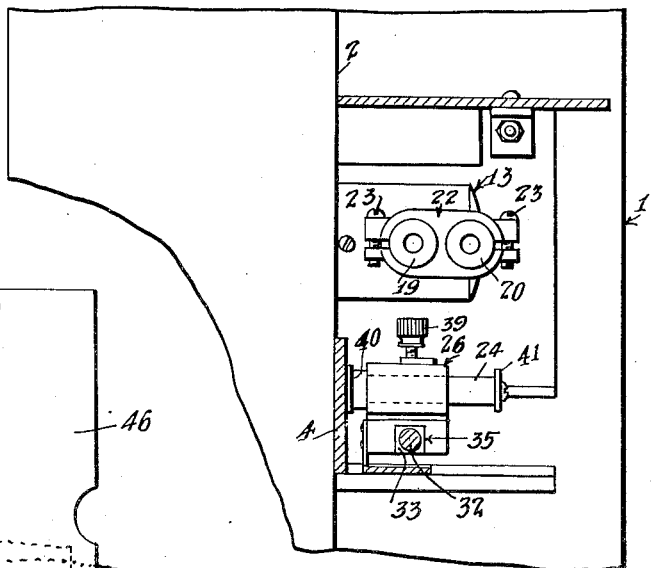
Fig. 5 is a vertical section taken about on the line 5—5 of Fig. 1, and further illustrating the details of the apparatus.

Referring more particularly to the parts, 1 indicates a case in which the projection apparatus is mounted, and such projection apparatus is usually located above the sound reproducing apparatus, so that the film passes vertically down through the case, the sound being reproduced by apparatus just below the shutter and other projection apparatus of the machine. In order to mount my apparatus, the case is preferably provided with a substantially vertical wall 2, which may be located at the end of the gear box 3, which carries parts of the mechanism used in feeding the film past the picture projection apparatus, and I also prefer to provide a transverse wall 4 that extends laterally from the wall 2. The vertical wall 2 preferably supports a film guide 5 through which the film 6 passes in a downward direction, being guided through the film guide by passing over suitable guide rollers 7 and 8, the latter of which is driven at a uniform speed so as to pull the film through the guide. The film guide 5 comprises a plate 9 having two openings 10 and 11, which are located so that one of them will lie opposite to the sound record on the film in either position of the film. On one side of the plate 9, I provide optical means and illuminating means capable of cooperating to project a beam of light through either of the openings 10 and 11, so that such beam will pass through the sound record on the film and control or vary current flowing in the sound circuit, the wires for which pass through a cable 12 connected to the end of a photo-electric unit 13. This photo-electric unit includes an outer shell 14 with an opening 15 in it, and the entire unit is mounted so that it will be shifted laterally to hold the opening 15 opposite the opening 10, or opposite the opening 11. In Fig. 2, this unit is shown aligned with the opening 10. In order to enable the unit 15 to be shifted in this way, I prefer to provide the unit with a neck 16 guided through a guide opening 17 in the wall 2, and this neck is provided at its ends with collars 18, which act as stops cooperating with the plate 2 to hold the unit in the desired position.

The optical means and the illuminating means to cooperate with the photo-electric unit, preferably comprises two optical units 19 and 20, which are mounted in a fixed position, preferably by securing them in openings 21 in the transverse wall 4. These units have the usual cylindrical form, and I provide for clamping them rigidly in the openings 21 by means of a suitable clamp 22 including a jaw 22ª fixed to the plate 4, and a movable jaw 22ᵇ that can be tightened up by means of small screws 23, (see Fig. 1).

Below the optical units I provide guiding means preferably consisting of a main horizontal guide bar 24 and an auxiliary guide bar 25, the former of which may be of round form, and the latter of which may be of rectangular form as indicated in Fig. 1. This main guide bar 24 supports most of the weight of a movable carriage 26, which carriage supports a lamp 27 which is capable of being aligned with the rear end of either of the optical units 19 and 20. This lamp is mounted on a suitable lamp bracket 28 that is supported on the carriage, so that the lamp can be adjusted up or down, or in a horizontal direction so as to bring it nearer to, or farther from the rear end of the optical unit with which it is cooperating. Any suitable adjusting means may be employed for the lamp bracket, but in the present instance, the lamp bracket comprises a substantially horizontal bar 29 that is guided in the carriage 26 to slide substantially parallel with the axes of the optical units 19 and 20. This bar 29 can be adjusted back and forth by means of an adjusting screw 30 having a milled head 31 at its outer end supported on the carriage 26. The end of the bar 29 opposite to the milled head 31, is bent upwardly to form an elbow 32, and this elbow supports a substantially vertical guide bar 33 on which the lamp bracket 34 is guided. This lamp bracket has a channel-shaped slot 35 that receives the guide bar 33 (see Fig. 3) and at its upper end is provided with an adjusting screw 36 that is threaded into the upper end of the guide bar 33. The milled head 37 of this adjusting screw 36 is mounted to swivel in a small bracket arm 38 carried by the upper end of the lamp bracket 28. Evidently by rotating the milled head 37 the lamp can be raised or lowered. The carriage 26 is provided with a set screw 39 (see Fig. 1) for clamping the carriage in a fixed position on the guide bar 24. The guide bar 24 is preferably threaded at its inner end into the vertical wall 2, and is provided near its inner end with an annular shoulder 40 against which the carriage 26 seats when in alignment with the optical unit 19. The outer end of the guide bar 24 has a collar 41 secured to it, against which the carriage 26 abuts when the lamp 27 is in alignment with the optical unit 20.

The lamp 27 is removably mounted in the clamp 42, and is supplied with current through an electric cord 43.

The carriage 26 is provided with a saddle plate 44 (see Fig. 1) that rides on the auxiliary guide bar 25, and this saddle plate maintains the carriage in an upright position and prevents it from rotating on the round guide bar 24.

Figure 6:
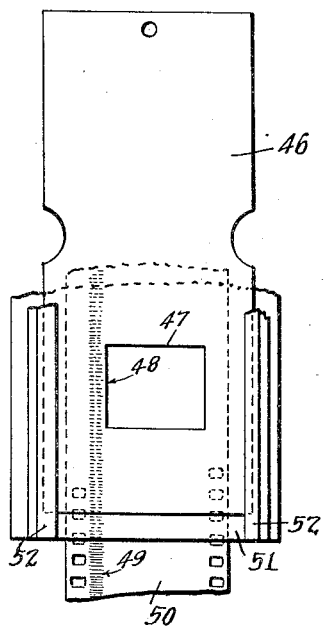
Fig. 6 is a front elevation at the aperture plate through which the pictures are projected, and illustrating means that I employ for preventing the casting of a picture of the sound track onto the screen when the film is in its reversed position.

As projection machines are not designed to operate with a reversed film, the reversal of the film in accordance with my invention would cause a picture of the sound record to appear on the screen. In order to overcome this difficulty I provide means for masking the sound track in the reversed position of the film, and this is preferably in the form of a reversible mask 46 (see Fig. 6) consisting of a plate with a light opening 47 through it, located nearer one side edge of the plate than the other. The edge 48 of the opening is located about in line with the inside edge of the sound record 49 on the film 50. When the film is reversed this mask is also reversed so that in either position the sound record will be masked. This mask may be mounted in any desired manner. In the present instance it is illustrated as mounted on the front face of the aperture plate 51, being guided at its side edges in guide cleats 52.

It is evident that when the film is reversed it is merely necessary to withdraw the mask from its guides and replace it in a reversed position.

It is understood that the embodiment of the invention described herein is only one of the many embodiments this invention may take, and I do not wish to be limited in the practice of the invention, nor in the claims, to the particular embodiment set forth.

What I claim is:

1. In a motion picture projection apparatus for projecting pictures from a film through a light aperture plate onto the forward side of a screen, and onto the rear side of the screen with the film in a reversed position, and for reproducing sounds from a sound track adjacent one edge of the projection film, the combination of means for guiding the film, a photo-electric cell mounted for movement in a direction transverse to the direction of movement of the film through the guiding means, and capable of assuming a position opposite either edge of the film, a lamp and optical means for cooperating with the photo-electric cell in either of said positions, and a mask in the form of a plate with a light opening therein located nearer to one side edge of the plate than the other, and located at the light aperture for masking the sound track in the reversed position of the film.

2. In a motion picture projection apparatus for projecting pictures from a film onto the forward side of a screen, and onto the rear side of the screen with the film in a reversed position, and for reproducing sounds from a sound track adjacent one edge of the projection film, the combination of means for guiding the film, a photo-electric cell mounted for movement in a direction transverse to the direction of movement of the film through the guiding means, and capable of assuming a position opposite either edge of the film, a pair of optical units mounted so that they are in alignment respectively with the edges of the film, a lamp with means for guiding the same into alignment with each of the optical units to enable the same to cooperate with the photo-electric cell in either of its said positions, and means for masking the sound track in the reversed position of the film.

3. In a motion picture projection apparatus for projecting pictures from a film through a light aperture plate onto the forward side of a screen, and onto the rear side of the screen with the film in a reversed position, and for reproducing sounds from a sound record on the edge of the projection film, the combination of means for guiding the film, a pair of optical units mounted so that they are in alignment respectively with the edges of the film, photo-electric means mounted so as to receive light through the edge of the film for cooperation with the optical units, illuminating means mounted at the end of the optical units remote from the film guide for casting rays onto the photo-electric means through the optical units, and means located at the aperture plate for masking the sound track on the film in the reversed position of the film.

4. In a motion picture projection apparatus for projecting pictures from a film onto the forward side of a screen, and onto the rear side of the screen with the film in a reversed position, and for reproducing sounds from a sound record at one edge of the film, the combination of a casing having a substantially vertical wall within the same, and a transverse wall extending laterally from the first-named wall, means mounted in the casing for guiding the film located at one side of the transverse wall, a pair of optical units extending through the transverse wall and mounted so that they are in alignment respectively with the edges of the film in the film guide, a carriage, means for guiding the carriage to slide laterally and substantially parallel with the transverse wall, a lamp bracket mounted on the carriage, a lamp carried thereby for alignment with either of the optical units, means on the carriage for adjusting the lamp bracket toward or from the rear ends of the optical units and for raising and lowering the same, a photo-electric cell, and means for guiding the same transversely of the film guide to enable it to be aligned with either of the optical units, and means for masking the sound track in the reversed position of the film.

5. In a motion picture projection apparatus for projecting pictures from a film onto the forward side of a screen, and onto the rear side of the screen with the film in a reversed position, and for reproducing sounds from the sound track at one edge of the projection film, the combination of a casing having a substantially vertical wall, and a transverse wall extending laterally from the first-named wall, a pair of substantially parallel optical units extending through the transverse wall, a film guide in front of the optical units for guiding the film with its edges substantially in alignment respectively with the axes of the optical units, guiding means supported below the optical units, a carriage mounted to slide on the guiding means, a lamp supported on the carriage and capable of aligning with the rear end of either of the optical units, a photo-electric cell guided to move transversely of the film guide and capable of alignment with either edge of the film to enable the same to cooperate with the lamp and either of the said optical units, and means for masking the sound track in the reversed position of the film.

6. In a motion picture projection apparatus for projecting pictures from a film onto the forward side or the rear side of a screen, and for reproducing sounds from a sound track on the edge of the projection film, the combination of means for guiding the film, a photo-electric cell mounted for movement in a direction transverse to the direction of movement of the film through the guiding means, and capable of assuming a position opposite either edge of the film, a lamp and optical means for cooperating with the photo-electric cell in either of said positions, and a reversible mask associated with the aperture through which the pictures are projected, said mask having an opening therewith with one of its edges nearer to the side edge of the mask than its other edge, and operating to mask the sound record in either of the positions of the film.

ALBERT B. SCOTT.